United States Patent Office 3,446,830
Patented May 27, 1969

3,446,830
PROCESS FOR THE PRODUCTION OF HYDROXYMETHYL-SUBSTITUTED ORGANOSILOXANES
Hans Niederprum, Monheim, Walter Simmler, Odenthal-Schlinghofen, and Elmar-Manfred Horn, Kurten, Bezirk, Cologne, Germany, assignors to Farbenfabriken Bayer Aktiengesellschaft, Leverkusen, Germany, a corporation of Germany
No Drawing. Filed June 29, 1966, Ser. No. 561,358
Claims priority, application Germany, July 3, 1965, F 46,519
Int. Cl. C07f 7/18
U.S. Cl. 260—448.2      6 Claims

ABSTRACT OF THE DISCLOSURE

Process for preparing organosiloxanes which contain at least one structural unit having the formula:

$$\text{HO—CH}_2\text{—Si(CH}_3)_m\text{—O}_{\frac{3-m}{2}}$$

wherein $m$ is 1 or 2 and as the remaining units, if any, structural units of the formula $$\text{R}_n\text{SiO}_{\frac{4-n}{2}}$$

wherein $n$ is 1, 2 or 3 and R is alkyl or aryl under conditions whereby substantially no side reactions take place and namely by reacting an acyloxymethylsilicon compound selected from the group consisting of silane derivatives

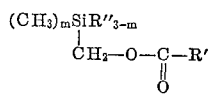

wherein $m$ is 1 or 2, R' is hydrogen, methyl, propyl or butyl and R" is $OCH_3$, $OC_2H_5$, $OC_3H_7$ or

or an organosiloxane containing at least one structural unit of the formula:

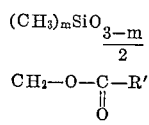

the remaining units, if any, having the formula $$\text{R}_n\text{SiO}_{\frac{4-n}{2}}$$

at a temperature of between 0 and 100° C. with an alkali metal borohydride and either boron trihalide or a silane derivative of the formula $\text{R}_a\text{SiCl}_{4-a}$ in which $a$ is 0, 1, 2 or 3 following which the product obtained is hydrolyzed with aqueous mineral acid or alkali metal hydroxide.

---

This invention relates to the production of organosiloxanes which contain at least one structural unit of the formula $$\text{HO—CH}_2\text{—Si(CH}_3)_m\text{—O}_{\frac{3-m}{2}}$$

in which $m$ is 1 or 2, and optionally additional structural units of the formula $$\text{R}_n\text{SiO}_{\frac{4-n}{2}}$$

in which $n$ is 1, 2 or 3 and each substituent R is an alkyl or aryl radical, preferably methyl or phenyl. These silicon compounds are known to be valuable intermediates for the preparation of esters, urethanes, acetals and polyether siloxanes and for the modification of synthetic resins such as polyesters and polyurethanes.

Organosiloxanes of this type may be obtained, according to a process known from British patent specification No. 980,778, by hydrolyzing bromomethyl-substituted organosiloxanes by means of an alcoholic alkaline solution at room temperature. This reaction, however, remains incomplete even after several days; in addition there occurs a splitting of the Si—O—Si bond and especially of the Si—C bond which is sensitive to nucleophilic attack. The products therefore deviate from the uniform and well-defined structure which is desired for the intended application.

A process for the production of 1,3-di-(hydroxymethyl)-tetramethyl-disiloxane and its copolymers with methyl-polysiloxanes is known from U.S. patent specification No. 2,527,591, in which 1,3-di-(acetoxymethyl)-tetramethyldisiloxane is transesterified with a very large excess of methanol and with a slight admixture of hydrochloric acid; copolymerization may be carried out simultaneously. However, this reaction also does not proceed completely with a very small amount of HCl and at a low temperature; on the other hand, an elevated temperature leads to splitting of the Si—CH$_2$ bond, and higher concentrations of HCl lead to the formation of $$\text{Si—CH}_2\text{—Cl}$$

besides the Si—CH$_2$—OH which is exclusively desired, so that in each case a substantial proportion (up to more than half) of the theoretical number of hydroxyl groups is missing in the product. The disadvantage mentioned above is thus even more pronounced in this case.

We have now found that acyloxymethyl-substituted organosiloxanes can be converted into the hydroxymethyl compounds defined above with high yield and virtually no side reactions by reduction of the acyl radicals, and according to the present invention a process for the production of these compounds comprises reacting an acyloxymethyl-silicon compound which is either a silane derivative of the formula

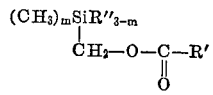

in which $m$ is 1 or 2, R' is H, $CH_3$, $C_2H_5$, $C_3H_7$ or $C_4H_9$ and R" is $OCH_3$, $-OC_2H_5$, $-OC_3H_7$ or

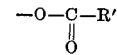

or an organosiloxane which contains at least one structural unit of the formula

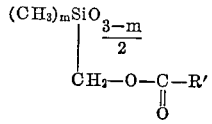

and optionally additional structural units of the formula $$\text{R}_n\text{SiO}_{\frac{4-n}{2}}$$

at a temperature between 0 and 100° C., with an alkali metal boro-hydride and with a boron halide of the formula $BX_3$, in which X is F, Cl or Br, or a silane derivative of the formula $R_a\text{SiCl}_{4-a}$ in which $a$ is 0, 1, 2 or 3, hydrolyzing the primary product thus obtained with an aqueous mineral acid or alkali metal hydroxide solution and isolating the end product by known methods.

The preferred acyl radical of the formula —C(O)—R' is acetyl, and NaBH$_4$ is preferred as the alkali metal borohydride for reasons of availability, economy and convenient handling, while the preferred boron halide is BF$_3$, especially in the form of its known etherates, e.g. its addition compounds with diethyl ether and tetrahydrofuran.

Examples of suitable silane derivatives of the formula R$_a$SiCl$_{4-a}$ are the following: silicon tetrachloride, methyl trichlorosilane, dimethyl dichlorosilane, diphenyl dichlorosilane, methylphenyl dischlorosilane and trimethyl chlorosilane. When these compounds are used in the process according to the invention, their silicon-bound halogen atom is exchanged for hydrogen; the resultant partially substituted silane derivatives, for example trimethylsilane, escape in the course of the reaction and can be conducted into cooling traps where they may be condensed and collected as by-products.

Examples of the acyloxy-methyl-silicon compounds to be reduced according to the invention are the following: dimethyl-(acetoxymethyl)-ethoxy-silane, dimethyl-(acetoxymethyl)-acetoxysilane, methyl-(acetoxymethyl)-diacetoxysilane, 1,3 - di-(formoxymethyl)-tetramethyl-disiloxane, 1,3 - di-(acetoxymethyl)-tetramethyl-disiloxane, acetoxymethyl-pentamethyl-disiloxane, 1,3 - di-(propionoxymethyl)-tetramethyl-disiloxane, 1,5 - di-(acetoxymethyl)-hexamethyl-trisiloxane, α,ω-di-(acetoxymethyl)-polydimethyl-siloxanes, pentamethyl-(acetoxymethyl)-cyclotrisiloxane and branched methylphenyl-polysiloxanes with terminal or lateral acetoxymethyl groups.

It is advantageous to carry out the reduction in the presence of an inert solvent or dispersing agent. Suitable diluents for this purpose are chiefly ethers, such as tetrahydrofuran, tetrahydropyran and diglycol dimethyl ether. In a typical mode of working the invention, the alkali metal borohydride is first suspended in the diluent, the acyloxy-methyl-silicon compound to be reduced is dissolved in the suspension and the boron halide or its etherate or the silane derivative of the formula R$_a$SiCl$_{4-a}$ is slowly added dropwise to this mixture. An exothermic reaction starts spontaneously in which sodium tetrafluoroborate or sodium chloride is precipitated. It is advisable to filter off the salt before subjecting the primary product thus obtained to further treatment by hydrolysis.

The reduction may be summarized as proceeding according to the following reaction schemes:

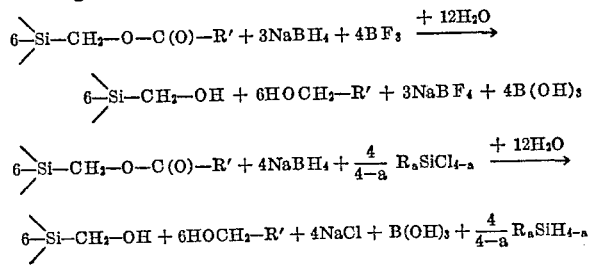

It is surprising that side reactions virtually do not occur and that a comparatively good yield is achieved without undesirable modifications of the structure, because it is known that boron halides can easily split the Si—O—C bond and also the Si—O—Si bond and that trimethylchlorosilane does not react with sodium borohydride even at elevated temperatures ("Organosilicon Compounds" by C. Eaborn, London 1960, page 197).

The following examples are given for the purpose of illustrating the invention.

Example 1

To a suspension of 44 g. (1.16 mol) sodium borohydride in 200 cc. tetrahydrofuran are added 278.5 g. (1 mol) 1,3-di-(acetoxymethyl)-tetramethyl-disiloxane and then, dropwise in the course of 2 hours, 206 g. (1.47 mol) boron trifluoride-tetrahydrofuranate. The mixture is allowed to boil for 2 hours and is filtered after cooling. The solvent is distilled off from the filtrate and the residue dissolved in 300 cc. ether. To the solution so obtained are added 500 cc. hydrochloric acid containing 5 percent by weight HCl followed by a sodium hydroxide solution containing 10 percent by weight NaOH, until the reaction of the aqueous phase is weakly alkaline. The aqueous phase is separated and extracted by shaking with ether, and the ether phases are combined and dried over sodium sulphate. The ether is then distilled off and the residue heated at 1 mm. Hg up to 60° C. There remain 171 g. (about 88% theoretical) of a colourless oil of refractive index $n_D^{20}$=1.4375 which contains 17.0 percent by weight of OH groups (calculated 17.5) and 0.2 percent by weight of acetyl groups.

This crude product can be purified virtually without decomposition by a fractional vacuum distillation. The main fraction boils at 95° C./0.5 mm. Hg; the refractive index of the distillation product is $n_D^{20}$=1.4390, and the OH content is 17.2 percent by weight. The product can be identified as di-(hydroxymethyl)-tetramethyl-disiloxane by infra-red and proton magnetic resonance spectra; in the latter the following chemical shifts are observed (internal standard: tetramethyl-silane): 0.09 p.p.m., 3.2 p.p.m. and 4.5 p.p.m., corresponding to Si—CH$_3$, Si—CH$_2$—O and OH with the relative intensities 6:2:1.

Example 2

Using a procedure analogous to that of Example 1, with the modification that the acyloxymethyl compound is 1 mol 1,3-di-(formoxymethyl)-tetramethyl-disiloxane, 165 g. (about 85% theoretical) 1,3-di-(hydroxymethyl)-tetramethyldisiloxane are finally isolated.

Example 3

Again using a procedure analogous to that of Example 1, with the modification that the acyloxymethyl compound is 1 mol 1-acetoxymethyl-3-(propionoxymethyl)-tetramethyldisiloxane, 174 g. (about 90% theoretical) 1,3-di-(hydroxymethyl)-tetramethyl-disiloxane are finally isolated.

Example 4

A suspension of 18 g. (0.48 mol) sodium borohydride in 200 cc. tetrahydrofuran is admixed with 410 g. of a branched acetoxymethyl-substituted methyl-polysiloxane having an acetyl content of 8.4 percent by weight CH$_3$CO (corresponding to 0.8 mol in the amount applied) and corresponding to the formula

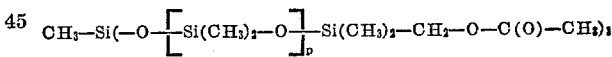

in which the number $p$ is about 4 to 5 and 3$p$ is, on average, equal to 14. 83 g. (0.59 mol) boron trifluoride-tetrahydrofuranate are added dropwise in the course of one hour to this mixture which is heated at boiling temperature for a further 4 hours and then filtered after cooling. The filtrate is treated as described in Example 1, including heating of the solvent-free residue at 60° C./1 mm. Hg. The product is filtered until clear, and 367 g. (about 94% theoretical) of a colourless oil are obtained. At 20° C. the density of the product is 0.995 g./cc., its viscosity is 49.3 cp. and its refractive index $n_D^{20}$ is 1.4134. The product contains 3.0 percent by weight of hydroxyl groups (calculated 3.5) and 0.8 percent by weight of acetyl groups.

Example 5

To a suspension of 61 g. (1.6 mol) sodium borohydride in 200 cc. tetrahydrofuran are added 190 g. (1 mol) dimethyl-(acetoxymethyl)-acetoxy-silane and then, dropwise in the course of 2 hours and with vigorous stirring, 174 g. (1.6 mol) trimethyl-chlorosilane. During this operation, a gas evolves in an exothermic reaction of the mixture; this can be identified by infra-red spectroscopy as (CH$_3$)$_3$SiH. The mixture is heated at boiling temperature for a further 2 hours, filtered after cooling, and the filtrate is treated as described in Example 1.91 g. (about 94% theoretical) 1,3-di-(hydroxymethyl)-tetramethyl-disiloxane are finally isolated.

What we claim is:
1. Process for the production of an organosiloxane which contains at least one structural unit of the formula

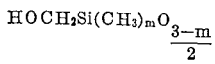

in which $m$ is 1 or 2, each of the remaining structural units having the formula

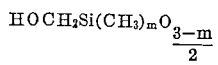

or the formula

in which $n$ is 1, 2 or 3 and each of the substituents R is a methyl or phenyl radical, which comprises reacting an acyloxy-methyl-silicon compound selected from the group consisting of a silane derivative having the formula $R'C(O)OCH_2Si(CH_3)_mR''_{3-m}$ and an organosiloxane which contains at least one structural unit of the formula

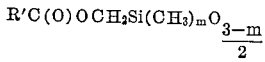

each of the remaining structural units having the formula

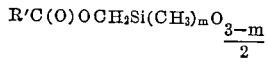

or the formula

in which formulae R' is H, $CH_3$, $C_2H_5$, $C_3H_7$ or $C_4H_9$ and R" is $OCH_3$ $OC_2H_5$, $OC_3H_7$, or $OC(O)R'$, the meaning of R, $m$ and $n$ being as defined above, at a temperature between 0 and 100° C., with an alkali metal borohydride and with boron trifluoride, boron trichloride or boron tribromide or a silane derivative of the formula $R_aSiCl_{4-a}$ in which $a$ is 0, 1, 2 or 3, hydrolyzing the primary product so obtained with an aqueous mineral acid or an alkali metal hydroxide solution, and recovering the hydrolysate.

2. Process as claimed in claim 1, wherein the reaction is carried out in the presence of an inert solvent or dispersing agent.

3. Process as claimed in claim 2 wherein the inert solvent is tetrahydrofuran.

4. Process as claimed in claim 1 wherein the alkali metal borohydride is sodium borohydride.

5. Process as claimed in claim 1 wherein the boron halide is used in the form of an etherate.

6. Process as claimed in claim 5 wherein the etherate is a tetrahydrofuranate.

References Cited

UNITED STATES PATENTS

| | | |
|---|---|---|
| 3,297,735 | 1/1967 | Simmler. |
| 3,324,161 | 6/1967 | Simmler. |
| 3,317,460 | 5/1967 | Clark et al. |
| 3,337,597 | 8/1967 | Berger. |
| 3,362,976 | 1/1968 | Berger. |

OTHER REFERENCES

Brown et al., J.A.C.S., 78, 2582 (1956).

TOBIAS E. LEVOW, *Primary Examiner.*
P. F. SHAVER, *Assistant Examiner.*